United States Patent [19]

Nakajima et al.

[11] Patent Number: 4,792,218
[45] Date of Patent: Dec. 20, 1988

[54] PROJECTION LENS FOR HIGH DEFINITION TV

[75] Inventors: Yasuo Nakajima, Ibaraki; Yoshiharu Yamamoto, Toyonaka; Yoshitomi Nagaoka, Neyagawa, all of Japan

[73] Assignee: Matsushita Electric Industrial Co., Ltd., Kadoma, Japan

[21] Appl. No.: 139,451

[22] Filed: Dec. 30, 1987

[30] Foreign Application Priority Data

Jan. 8, 1987 [JP] Japan .................................. 62-2380

[51] Int. Cl.$^4$ .......................... G02B 13/18; G02B 9/62
[52] U.S. Cl. .................................... 350/432; 350/412
[58] Field of Search ...................... 350/432, 412, 464

[56] References Cited

U.S. PATENT DOCUMENTS

| | | |
|---|---|---|
| 3,868,173 | 2/1975 | Miles et al. |
| 3,961,844 | 6/1976 | Betensky ............... 350/412 |
| 4,300,817 | 11/1981 | Betensky ............... 350/412 |
| 4,348,081 | 9/1982 | Betensky ............... 350/412 |

FOREIGN PATENT DOCUMENTS

| | | |
|---|---|---|
| 58-125007 | 7/1983 | Japan . |
| 59-155818 | 9/1984 | Japan . |
| 59-170812 | 9/1984 | Japan . |

Primary Examiner—John K. Corbin
Assistant Examiner—Rebecca D. Gass
Attorney, Agent, or Firm—Wenderoth, Lind and Ponack

[57] ABSTRACT

A high definition projection lens for projecting on a screen an enlargement of an image appearing on a high resolution CRT is disclosed. The projection lens comprises a first lens having a positive optical power and a convex surface facing the screen, a meniscus second lens having a positive optical power, a third lens having bi-concave surfaces and a negative optical power, a fourth lens having a positive optical power, a fifth lens having bi-convex surfaces and a positive optical power, and a sixth lens having a negative power and an aspheric concave surface facing the fifth lens.

15 Claims, 2 Drawing Sheets

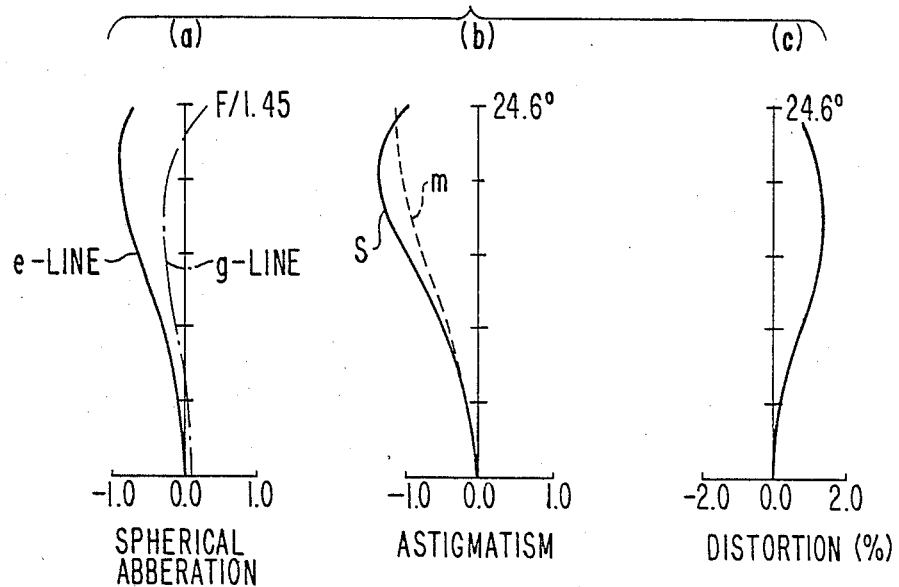
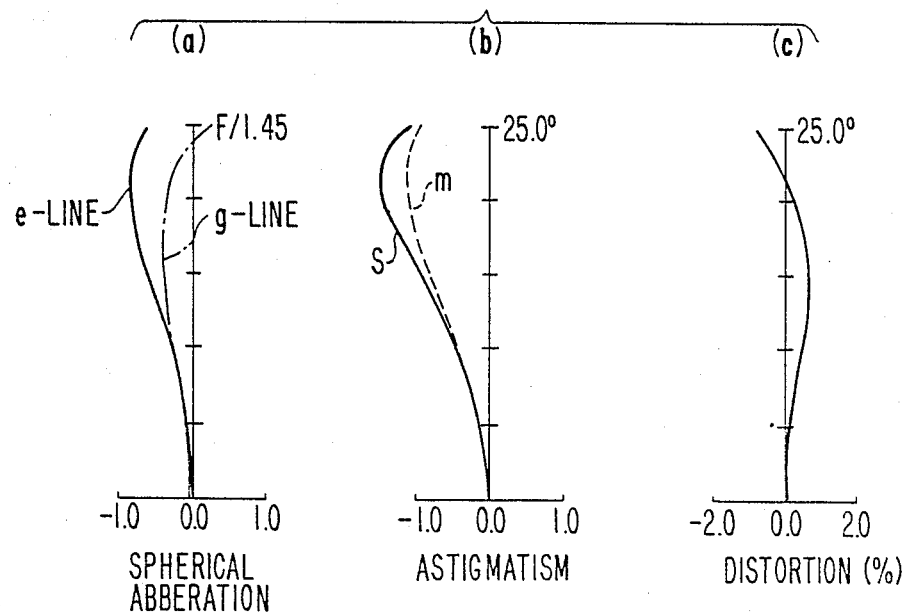

PROJECTION LENS FOR HIGH DEFINITION TV

BACKGROUND OF THE INVENTION

1. Field of the Invention

The present invention relates to a projection lens used in a video projector for projecting on a screen an enlargement of an image appearing on a cathode-ray tube (CRT), and more particularly to a high resolution projection lens applicable to a high definition video projector employing a high resolution CRT.

2. Description of the Prior Art

Conventional projection lenses as disclosed in Japanese Laid-Open patent applications Nos. 58-125007 and 59-155818 and U.S. Pat. Nos. 4,300,817 and 4,348,081 are for the CRT on which an image is formed by 525 scanning lines(resolution is 525 lines), and most of them do not provide correction for chromatic aberration. Some projection lenses which provide correction for chromatic aberration have been proposed as disclosed in the Japanese Laid-Open patent application No. 59-170812 and U.S. Pat. No. 3,888,173.

However, these conventional projection lenses have, because of large residual aberrations, a serious deficiency of performance as a projection lens for use in a high definition video projector of 1,125 scanning lines.

SUMMARY OF THE INVENTION

It is an object of the present invention to solve disadvantages of the prior art described above and provide a large aperture and high definition projection lens.

Another object of this invention is to provide a new and improved projection lens for a high resolution CRT on which an image is formed by 1,125 scanning lines, while maintaining satisfactorily excellent aberration correction.

A projection lens of the present invention comprises first, second, third, fourth, fifth and sixth lenses which are disposed successively in a direction from a screen end to a CRT end. The first lens has a positive optical power and a convex surface that faces the screen. The second lens is a meniscus lens having a positive optical power. The third lens is a bi-concave lens having a negative optical power. The fourth lens has a positive optical power. The fifth lens is a bi-convex lens having a positive optical power. The sixth lens has a negative optical power and an aspheric concave surface that faces the fifth lens. Optical parameters of the projection lens according to the present invention are selected to satisfy the following conditions:

$$2.5 \leq f_a/f \leq 5$$

$$0.45 \leq d_8/d_{10} \leq 1.0$$

$$\nu_2 \div 50$$

$$\nu_3 \leq 38$$

where: f is a focal length of the overall projection lens system; $f_a$ is a combined focal length of the first, second and third lenses; $d_8$ is a distance between the fourth and fifth lenses; $d_{10}$ is a distance between the fifth and sixth lenses; and $\nu_2$, $\nu_3$ are respectively Abbe numbers of the second and third lenses.

The above and other objects, features and advantages of the invention will become apparent from the following description taken in connecting with the accompanying drawings in which:

BRIEF DESCRIPTION OF THE DRAWINGS

FIG. 2 and FIG. 3 are respectively aberration diagrams of embodiments 1 and 2.

DESCRIPTION OF THE PREFERRED EMBODIMENTS

Figure 1:
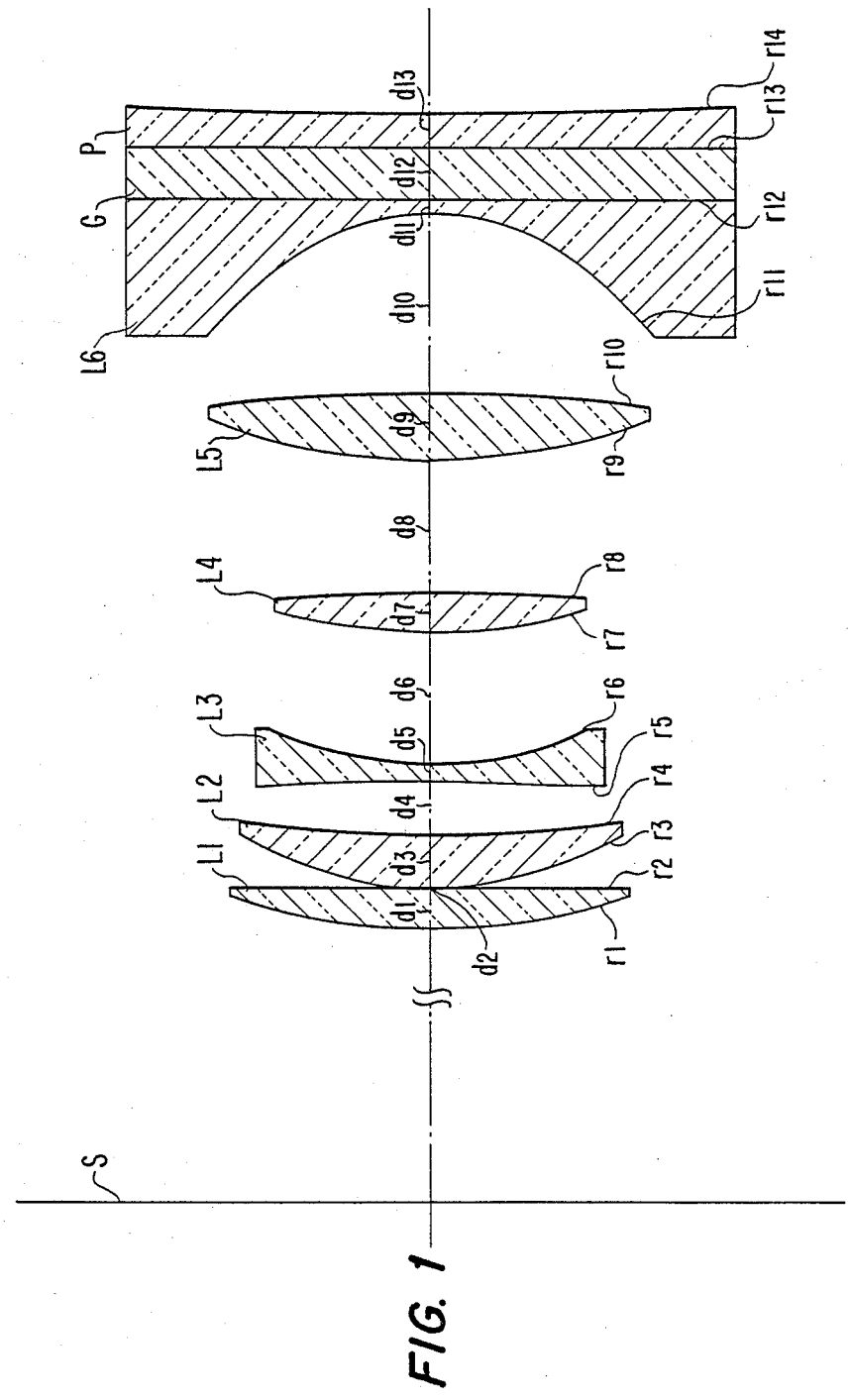
FIG. 1 is a sectional view showing a structure of projection lenses of embodiments and 2.

FIG. 1 is a sectional view showing a structure of a projection lens of the present invention. In FIG. 1, a first lens $L_1$ is an element of a positive optical power having a convex surface that faces a screen S. A second lens $L_2$ is an element of a positive optical power having a meniscus shape. A third lens $L_3$ is an element of a negative optical power having bi-concave surfaces. A fourth lens $L_4$ is an element having a positive optical power. A fifth lens $L_5$ is an element of a positive optical power having bi-convex surfaces. A sixth lens $L_6$ is an element of a negative optical power having an aspheric surface that is a concave surface facing the fifth lens. An element P is a face plate of a CRT. A space between the sixth lens $L_6$ and the face plate P of the CRT is filled with an optical transparent medium G. The optical transparent medium G may be ethylene glycol or silicone gel or other materials having a refractive index that is almost the same as that of each of the face plate P and the sixth lens $L_6$. In the projection system having the projection lens shown in FIG. 1, reflections at the surface of the face plate P and at the surface of the sixth lens $L_6$ facing the CRT can be prevented, so that a high contrast image can be obtained.

The projection lens of the present invention is as bright as about 1.45 or less in terms of F number and has a semi-field angle ranging from 20° to 30°. It is required for effectively correcting spherical aberration that the second lens $L_2$ is meniscus shaped and a surface facing the screen is convex. It is also required for effectively correcting field curvature that the sixth lens has at least an aspheric concave surface facing the fifth lens. Moreover, selection of optical parameters is important for realizing a high definition projection lens. The projection lens of the present invention satisfies the following conditions, in which the focal length of the overall projection lens system is f, the combined focal length of the first, second and third lenses is $f_a$, the distance between the fourth and fifth lenses is $d_8$, the distance between the fifth and sixth lenses is $d_{10}$, the Abbe numbers of the second and third lenses are respectively $\nu_2$ and $\nu_3$:

$$2.5 \leq f_a/f \leq 5 \quad (1)$$

$$0.45 \leq d_8/d_{10} \leq 1.0 \quad (2)$$

$$\nu_1 \leq 50 \quad (3)$$

$$\nu_4 \leq 38 \quad (4)$$

The condition (1) relates to distribution of combined optical power of the first, second and third lenses $L_1$, $L_2$ and $L_3$. If $f_a/f$ is below the lower limit of condition (1), the lens system is superior in compactness, but the combined optical power is too strong to properly correct for spherical aberration. If $f_a/f$ exceeds the upper limit of condition (1), the optical power of the fourth lens becomes too strong to properly correct for on-axis and off-axis aberration.

The condition (2) defines the position of the fifth lens, $L_5$ in relation to the fourth and sixth lenses $L_4$ and $L_6$. If $d_8/d_{10}$ is below the lower limit of condition (2), correction for of-axis aberration becomes difficult. The lower limit of condition (2) also serves to maintain a focal point shift caused by a temperature variation which occurs when a plastic lens is used as the fifth lens within an allowable range free of any obstacle in practical use. If $d_8/d_{10}$ exceeds the upper limit of condition (2), correction for field curvature becomes difficult.

If the Abbe numbers of the first and second lenses do not respectively satisfy conditions (3) and (4), correction for chromatic aberration becomes difficult.

Moreover, it is preferable to satisfy the following conditions for realizing a projection lens having further improved optical performance, in which the focal length of the fourth lens $L_4$ is $f_4$ and that of the fifth lens $L_5$ is $f_5$:

$$1.25 \leq f_4/f \leq 1.8 \quad (5)$$

$$0.5 \leq f_4/f_5 \leq 1.0 \quad (6)$$

The condition (5) relates to distribution of the focal length of the fourth lens. If $f_4/f$ is below the lower limit of condition (5), the optical power of the fourth lens is too strong to properly correct for spherical aberration. If $f_4/f$ exceeds the upper limit of condition (5), the optical power is too weak to properly correct for coma.

The condition (6) relates to distribution of the focal length of the fifth and sixth lenses $L_5$ and $L_6$. If $f_4/f_5$ is below the lower limit of condition (6), the optical power of the fourth lens is too strong to properly correct for spherical aberration. If $f_4/f_5$ exceeds the upper limit of condition (6), the optical power of the fifth lens is too strong to properly correct for off-axis aberration. The upper limit of condition (6) also serves to maintain a focal point shift caused by a temperature variation which occurs when a plastic lens is used as the fifth lens within an allowable range free of any obstacle in practical use.

The fifth lens $L_5$ may be preferably an aspheric lens for a further improved correction of aberration.

The fifth lens $L_5$ and sixth lens $L_6$, which are positioned near the CRT, are required to have a large effective aperture. So, the fifth and sixth lenses may be plastic lenses to attain reduction of weight and cost.

Two preferred embodiments of the present invention will be indicated below. Embodiments 1 and 2 have the structure shown in FIG. 1. In the tables of these embodiments: f is a focal length of the overall lens system; FNO is F number; $\beta$ is a magnification factor of the projected enlarged image; $\omega$ is a semi-field angle; $f_a$ is a combined focal length of the first, second and third lenses; $f_4$ is a focal length of the fourth lens; $f_5$ is a focal length of the fifth lens; $r_1$, $r_2$, —are radii of curvature of lens surfaces disposed successively from the screen end; $d_1$, $d_2$, —are axial distances between each adjacent two of the lens surfaces; $n_1$, $n_2$, —are refractive indices with respect to e-line of the lenses; $\nu_1$, $\nu_2$, —are Abbe numbers of the lenses. In addition, each lens surface indicated by asterisk (?) means an aspheric surface. The shape of each aspheric surface is expressed by the following equation, in which the optical axis direction is X axis, Y axis is set perpendicular to X axis, curvature at the apex of the aspheric surface is $C(=1/r)$, the conic constant is K, and the coefficients of the aspheric surfaces are AD, AE, AF and AG:

$$X = \frac{CY^2}{1 + \sqrt{1 - (1+K)C^2Y^2}} + AD \cdot Y^4 + AE \cdot Y^6 + AF \cdot Y^8 + AG \cdot Y^{10} \quad (7)$$

Embodiment 1

| | f = 260.076 mm  FNO = 1.45  $\beta$ = −18.0  $\omega$ = 24.6° | | | |
|---|---|---|---|---|
| | $f_a$ = 920.865 mm  $f_4$ = 350.273 mm  $f_5$ = 440.981 mm | | | |
| $L_1$ | $r_1$ = 304.091 | $d_1$ = 17.50 | $n_1$ = 1.59143 | $\nu_1$ = 61.25 |
| | $r_2$ = 2791.969 | $d_2$ = 1.00 | | |
| $L_2$ | $r_3$ = 172.476 | $d_3$ = 23.50 | $n_2$ = 1.68082 | $\nu_2$ = 55.52 |
| | $r_4$ = 638.510 | $d_4$ = 23.76 | | |
| $L_3$ | $r_5$ = −1583.198 | $d_5$ = 8.50 | $n_3$ = 1.76168 | $\nu_3$ = 27.53 |
| | $r_6$ = 184.524 | $d_6$ = 59.22 | | |
| $L_4$ | $r_7$ = 261.306 | $d_7$ = 17.50 | $n_4$ = 1.59143 | $\nu_4$ = 61.25 |
| | $r_8$ = −974.879 | $d_8$ = 59.53 | | |
| $L_5$ | $r_9$* = 302.376 | $d_9$ = 29.50 | $n_5$ = 1.49383 | $\nu_5$ = 57.70 |
| | $r_{10}$* = −753.190 | $d_{10}$ = 83.65 | | |
| $L_6$ | $r_{11}$* = −100.754 | $d_{11}$ = 5.00 | $n_6$ = 1.49383 | $\nu_6$ = 57.70 |
| G | $r_{12}$ = ∞ | $d_{12}$ = 23.83 | $n_7$ = 1.40000 | $\nu_7$ = 50.70 |
| P | $r_{13}$ = ∞ | $d_{13}$ = 16.00 | $n_8$ = 1.54000 | $\nu_8$ = 50.70 |
| | $r_{14}$ = 4000.000 | | | |

| Aspheric surface coefficients | | |
|---|---|---|
| 9th surface ($r_9$) | 10th surface ($r_{10}$) | 11th surface ($r_{11}$) |
| K = 1.19206 × 10$^{-1}$ | K = −2.16641 × 10 | K = −5.91635 × 10$^{-1}$ |
| AD = 0 | AD = 0 | AD = −2.64843 × 10$^{-8}$ |
| AE = 0 | AE = 0 | AE = 5.16019 × 10$^{-12}$ |
| AF = 0 | AF = 0 | AF = 0 |

-continued

| AG = 0 | AG = 0 | AG = 0 |
|---|---|---|

Embodiment 2

$f = 259.729$ mm  FNO = 1.45  $\beta = -20.0$  $\omega = 25.0°$
$f_a = 900.418$ mm  $f_4 = 369.449$ mm  $f_5 = 395.394$ mm

| | | | | |
|---|---|---|---|---|
| $L_1$ | $r_1 = 304.403$ | $d_1 = 18.00$ | $n_1 = 1.59143$ | $\nu_1 = 61.25$ |
| | $r_2 = 3129.676$ | $d_2 = 1.00$ | | |
| $L_2$ | $r_3 = 173.581$ | $d_3 = 24.00$ | $n_2 = 1.68082$ | $\nu_2 = 55.52$ |
| | $r_4 = 666.633$ | $d_4 = 22.05$ | | |
| $L_3$ | $r_5 = -1577.059$ | $d_5 = 9.00$ | $n_3 = 1.76168$ | $\nu_3 = 27.53$ |
| | $r_6 = 184.935$ | $d_6 = 56.84$ | | |
| $L_4$ | $r_7 = 314.512$ | $d_7 = 15.00$ | $n_4 = 1.68082$ | $\nu_4 = 55.52$ |
| | $r_8 = -1231.735$ | $d_8 = 67.33$ | | |
| $L_5$ | $r_9{}^* = 280.976$ | $d_9 = 33.50$ | $n_5 = 1.49383$ | $\nu_5 = 57.70$ |
| | $r_{10}{}^* = -614.804$ | $d_{10} = 78.35$ | | |
| $L_6$ | $r_{11}{}^* = -96.269$ | $d_{11} = 5.00$ | $n_6 = 1.49383$ | $\nu_6 = 57.70$ |
| | $r_{12} = \infty$ | $d_{12} = 22.27$ | $n_7 = 1.40000$ | $\nu_7 = 50.70$ |
| G | | | | |
| P | $r_{13} = \infty$ | $d_{13} = 16.00$ | $n_8 = 1.54000$ | $\nu_8 = 50.70$ |
| | $r_{14} = 4000.000$ | | | |

| | Aspheric surface coefficients | |
|---|---|---|
| 9th surface (r9) | 10th surface (r10) | 11th surface (r11) |
| K = 7.03666 × 10$^{-1}$ | K = −5.60962 | K = −8.98400 × 10$^{-1}$ |
| AD = 0 | AD = 0 | AD = −2.09391 × 10$^{-8}$ |
| AE = 0 | AE = 0 | AE = 3.26864 × 10$^{-12}$ |
| AF = 0 | AF = 0 | AF = 0 |
| AG = 0 | AG = 0 | AG = 0 |

FIG. 2 and FIG. 3 respectively show aberration performances of embodiments 1 and 2. In each of FIGS. 2 and 3, (a), (b) and (c) respectively show spherical aberration for the e-line and the g-line, astigmatism and distortion. As seen from FIGS. 2 and 3, these aberrations are excellently corrected in both of embodiments 1 and 2.

What is claimed is:

1. A projection lens for projecting on a screen an enlargement of an image appearing on a cathode ray tube (CRT), comprising, successively in a direction from the screen end to the CRT end: a first lens having a positive optical power and a convex surface facing the screen; a second lens having a positive optical power and a meniscus shape; a third lens having a negative optical power and bi-concave surfaces; a fourth lens having a positive optical power; a fifth lens having a positive optical power and bi-convex surfaces; and a sixth lens having a negative optical power and an aspheric concave surface facing said fifth lens, wherein the projection lens satisfies the following condition:

$2.5 \leq f_a/f \leq 5$ $0.45 \leq d_8/d_{10} \leq 1.0$ $\nu_2 \geq 50$ $\nu_3 \leq 38$ where: f is a focal length of the overall projection lens system; $f_a$ is a combined focal length of the first, second and third lenses; $d_8$ is a distance between the fourth and fifth lenses; $d_{10}$ is a distance between the fifth and sixth lenses; and $\nu_2$ and $\nu_3$ are respectively Abbe numbers of the second and third lenses.

2. The projection lens according to claim 1, further satisfying the following condition:

$1.25 \leq f_4/f \leq 1.8$ $0.5 \leq f_4/f_5 \leq 1.0$ where $f_4$ is a focal length of the fourth lens and $f_5$ is a focal length of the fifth lens.

3. The projection lens according to claim 1, wherein said fifth lens has an aspheric surface.

4. The projection lens according to claim 1, wherein said fifth lens is a plastic lens.

5. The projection lens according to claim 1, wherein said sixth lens is a plastic lens.

6. The projection lens according to claim 1, wherein a space between the sixth lens and a face plate of the CRT is filled with a transparent medium.

7. The projection lens according to claim 6, defined substantially as follows:

$f = 260.076$ mm  FNO = 1.45  $\beta = -18.0$  $\omega = 24.6°$
$f_a = 920.865$ mm  $f_4 = 350.273$ mm  $f_5 = 440.981$ mm

| | | | | |
|---|---|---|---|---|
| $L_1$ | $r_1 = 304.091$ | $d_1 = 17.50$ | $n_1 = 1.59143$ | $\nu_1 = 61.25$ |
| | $r_2 = 2791.969$ | $d_2 = 1.00$ | | |

-continued

| | | | | |
|---|---|---|---|---|
| $L_2$ | $r_3 = 172.476$<br>$r_4 = 638.510$ | $d_3 = 23.50$<br>$d_4 = 23.76$ | $n_2 = 1.68082$ | $\nu_2 = 55.52$ |
| $L_3$ | $r_5 = -1583.198$<br>$r_6 = 184.524$ | $d_5 = 8.50$<br>$d_6 = 59.22$ | $n_3 = 1.76168$ | $\nu_3 = 27.53$ |
| $L_4$ | $r_7 = 261.306$<br>$r_8 = -974.879$ | $d_7 = 17.50$<br>$d_8 = 59.53$ | $n_4 = 1.59143$ | $\nu_4 = 61.25$ |
| $L_5$ | $r_9^* = 302.376$<br>$r_{10}^* = -753.190$ | $d_9 = 29.50$<br>$d_{10} = 83.65$ | $n_5 = 1.49383$ | $\nu_5 = 57.70$ |
| $L_6$ | $r_{11}^* = -100.754$<br>$r_{12} = \infty$ | $d_{11} = 5.00$<br>$d_{12} = 23.83$ | $n_6 = 1.49383$<br>$n_7 = 1.40000$ | $\nu_6 = 57.70$<br>$\nu_7 = 50.70$ |
| G | | | | |
| P | $r_{13} = \infty$<br>$r_{14} = 4000.000$ | $d_{13} = 16.00$ | $n_8 = 1.54000$ | $\nu_8 = 50.70$ |

| | Aspheric surface coefficients | |
|---|---|---|
| 9th surface ($r_9$) | 10th surface ($r_{10}$) | 11th surface ($r_{11}$) |
| $K = 1.19206 \times 10^{-1}$ | $K = -2.16641 \times 10$ | $K = -5.91635 \times 10^{-1}$ |
| $AD = 0$ | $AD = 0$ | $AD = -2.64843 \times 10^{-8}$ |
| $AE = 0$ | $AE = 0$ | $AE = 5.16019 \times 10^{-12}$ |
| $AF = 0$ | $AF = 0$ | $AF = 0$ |
| $AG = 0$ | $AG = 0$ | $AG = 0$ | where: $L_1$-$L_6$, G and P denote the first through sixth lenses, the transparent medium and the face plate of the CRT, respectively, which are elements for constituting the projection lens; FNO is F number; $\beta$ is magnification factor of an projected enlarged image; $\omega$ is a semi-field angle; $f_4$ is a focal length of the fourth lens; $f_5$ is a focal length of the fifth lens; $r_1$-$r_{14}$ are radii of curvature of successive surfaces of the elements in the direction from the screen end to the CRT end; $d_1$-$d_{13}$ are axial distances between the surfaces; $n_1$-$n_8$ are refractive indices with respect to e-line of the elements; $\nu_1$-$\nu_8$ are Abbe numbers of the elements; K is a conic constant; AD, AE, AF, and AG are coefficients of respective aspheric surfaces each being indicated by ?.

8. The projection lens according to claim 6, defined substantially as follows:

$f = 259.729$ mm  FNO = 1.45  $\beta = -20.0$  $\omega = 25.0°$
$f_a = 900.418$ mm  $f_4 = 369.449$ mm  $f_5 = 395.394$ mm

| | | | | |
|---|---|---|---|---|
| $L_1$ | $r_1 = 304.403$<br>$r_2 = 3129.676$ | $d_1 = 18.00$<br>$d_2 = 1.00$ | $n_1 = 1.59143$ | $\nu_1 = 61.25$ |
| $L_2$ | $r_3 = 173.581$<br>$r_4 = 666.633$ | $d_3 = 24.00$<br>$d_4 = 22.05$ | $n_2 = 1.68082$ | $\nu_2 = 55.52$ |
| $L_3$ | $r_5 = -1577.059$<br>$r_6 = 184.935$ | $d_5 = 9.00$<br>$d_6 = 56.84$ | $n_3 = 1.76168$ | $\nu_3 = 27.53$ |
| $L_4$ | $r_7 = 314.512$<br>$r_8 = -1231.735$ | $d_7 = 15.00$<br>$d_8 = 67.33$ | $n_4 = 1.68082$ | $\nu_4 = 55.52$ |
| $L_5$ | $r_9^* = 280.976$<br>$r_{10}^* = -614.804$ | $d_9 = 33.50$<br>$d_{10} = 78.35$ | $n_5 = 1.49383$ | $\nu_5 = 57.70$ |
| $L_6$ | $r_{11}^* = -96.269$<br>$r_{12} = \infty$ | $d_{11} = 5.00$<br>$d_{12} = 22.27$ | $n_6 = 1.49383$<br>$n_7 = 1.40000$ | $\nu_6 = 57.70$<br>$\nu_7 = 50.70$ |
| G | | | | |
| P | $r_{13} = \infty$<br>$r_{14} = 4000.000$ | $d_{13} = 16.00$ | $n_8 = 1.54000$ | $\nu_8 = 50.70$ |

| | Aspheric surface coefficients | |
|---|---|---|
| 9th surface ($r_9$) | 10th surface ($r_{10}$) | 11th surface ($r_{11}$) |
| $K = 7.03666 \times 10^{-1}$ | $K = -5.60962$ | $K = -8.98400 \times 10^{-1}$ |
| $AD = 0$ | $AD = 0$ | $AD = -2.09391 \times 10^{-8}$ |
| $AE = 0$ | $AE = 0$ | $AE = 3.26864 \times 10^{-12}$ |
| $AF = 0$ | $AF = 0$ | $AF = 0$ |
| $AG = 0$ | $AG = 0$ | $AG = 0$ | where: $L_1$-$L_6$, G and P denote the first through sixth lenses, the transparent medium and the face plate of the CRT, respectively, which are elements for constituting the projection lens; FNO is F number; $\beta$ is a magnification factor of an projected enlarged image; $\omega$ is a semi-field angle; $f_4$ is a focal length of the fourth lens; $f_5$ is a focal length of the fifth lens; $r_1$-$r_{14}$ are radii of curvature of successive surfaces of the elements in the direction from the screen end to the CRT end; $d_1$-$d_{13}$ are axial distances between the surfaces; $n_1$–$n_8$ are refractive indices with respect to e-line of the elements; $\nu_1$–$\nu_8$ are Abbe numbers of the elements; K is a conic constant; AD, AE, AF and AG are coefficients of respective aspheric surfaces each being indicated by *.

9. A high resolution projection lens for projecting on a screen an enlargement of an image of a resolution of more than 525 lines appearing on a high resolution cathode ray tube (CRT), comprising, successively in a direction from the screen end to the CRT end: a first lens of a positive optical power having a convex surface facing the screen; a second lens of a positive optical power having a meniscus shape; a third lens of a negative optical power having bi-concave surfaces; a fourth lens of a positive optical power; a fifth lens of a positive optical power having bi-convex surfaces; and a sixth lens of a negative optical power having an aspheric concave surface facing the fifth lens.

10. The projection lens according to claim 9, satisfying the following condition:

$2.5 \leq f_a/f \leq 5$ $0.45 \leq d_8/d_{10} \leq 1.0$ $\nu_2 \geq 50$ $\nu_3 \geq 38$ where: f is a focal length of the overall lens system; $f_a$ is a combined focal length of the first through third lenses; $d_8$ is a distance between the fourth and fifth lenses; $d_{10}$ is a distance between the fifth and sixth lenses; and $\nu_2$ and $\nu_3$ are respectively Abbe numbers of the second and third lenses.

11. The projection lens according to claim 10, further satisfying the following condition:

$1.25 \leq f_4/f \leq 1.8$ $0.5 \leq f_4/f_5 \leq 1.0$ where $f_4$ and $f_5$ are focal lengths of the fourth and fifth lenses, respectively.

12. The projection lens according to claim 9, wherein the fifth lens has an aspheric surface.

13. The projection lens according to claim 9, wherein the fifth lens is a plastic lens.

14. The projection lens according to claim 9, wherein the sixth lens is a plastic lens.

15. The projection lens according to claim 9, wherein a space between the sixth lens and a face plate of the CRT is filled with a transparent medium having a refractive index which is almost the same as that of each of the sixth lens and the face plate of the CRT.

* * * * *